Jan. 5, 1971　　　H. J. SCHWERDHOFER　　　3,552,233

AUTOMATICALLY SHIFTING MULTIPLE-SPEED HUB

Filed Sept. 20, 1968

INVENTOR
Hans Joachim Schwerdhöfer
By: Toss and Berman
AGENTS

United States Patent Office 3,552,233
Patented Jan. 5, 1971

3,552,233
AUTOMATICALLY SHIFTING MULTI-SPEED HUB
Hans Joachim Schwerdhöfer, Schweinfurt, Germany, assignor to Fichtel & Sachs A.G., Schweinfurt, Germany
Filed Sept. 20, 1968, Ser. No. 761,262
Claims priority, application Germany, Oct. 17, 1967, 1,605,779
Int. Cl. F16h 5/42
U.S. Cl. 74—752    5 Claims

ABSTRACT OF THE DISCLOSURE

A multiple speed hub for a bicycle or like vehicle has a planetary gear transmission built into the hub shell. The driver and a first set of pawls are mounted on the planet carrier. A second set of pawls is mounted on the ring gear and is normally withdrawn from a ratchet on the hub shell. Centrifugal weights are coupled to the planet carrier or the ring gear either directly or through speed-increasing gearing and release the second set of pawls against the restraint of a return spring at sufficient speed of the associated transmission element. The centrifugal weights and all associated drive elements are stopped during freewheeling.

BACKGROUND OF THE INVENTION

This invention relates to multiple-speed hubs for bicycles and like vehicles, and particularly to a multiple speed hub whose transmission is shifted automatically by a centrifugal governor at selected speeds.

Centrifugally controlled, automatically shifted multiple speed hubs are known. Their flyweights are driven by the hub shell through a permanently engaged motion transmitting train which may include a speed increasing gear transmissions to permit a reduction in the weight and bulk of the flyweights.

It has now been found that friction in the governor mechanism absorbs enough energy during freewheeling or coasting to brake a bicycle equipped with the known mechanism, and that the drive elements for the flyweights are subject to significant wear, particularly if they include gears, and must either be built to close tolerances or made relatively heavy to give them a lifetime similar to that of other hub elements such as the usual planetary gear transmission. Both solutions of the wear problem are relatively costly and may require more space in the hub shell than can conveniently be spared.

The primary object of the invention is the provision of a multiple speed hub in which the drive elements for the flyweights do not hamper coasting, have a long useful life, yet are capable of being produced at low cost.

SUMMARY OF THE INVENTION

It has been observed that a bicycle is normaly permitted to coast over a significant portion of its operating time. Because of the permanent driving connection between the hub shell and the flyweights in the centrifugally shifted multiple-speed hubs known heretofore wear of the drive elements for the flyweights continues in the known hubs during coasting or freewheeling although the flyweights cannot perform a useful function under such operating conditions.

The instant invention provides an improvement in a multiple-speed hub having a plurality of transmission members operatively connected to each other for simultaneous rotation at different speeds, and several over-running clutches respectively interposed between the transmission members and the hub shell for transmitting movement from an externally driven drive member to the hub shell. One of the clutches may be disengaged by a speed shifting mechanism in response to the movement of a flyweight between an inoperative and an operative position caused by a change in the rotary speed of the flyweight. The flyweight is rotated by a drive mechanism which includes an input member connected to one of the afore-mentioned transmission members for joint rotation therewith, an output member similarly connected to the flyweight, and a connection between the input and output members which causes the members to rotate simultaneously, and to stop simultaneously. The drive mechanism of the invention and the connected flyweights stand still during coasting. Wear of the drive mechanism is correspondingly reduced, and frictional drag of the governor mechanism does not absorb energy during coasting.

The input member of the drive mechanism may be connected to a driver, to a planet carrier, or to a ring gear if the hub is equipped with a planetary gear transmission, and the connection between the input and output members of the drive mechanism may include a speed increasing transmission.

Other features, additional objects, and many of the attendant advantages of this invention will readily be appreciated as the same becomes better understood by reference to the following detailed description of preferred embodiments when considered in connection with the attached drawing.

DESCRIPTION OF THE PREFERRED EMBODIMENTS

Figure 1:
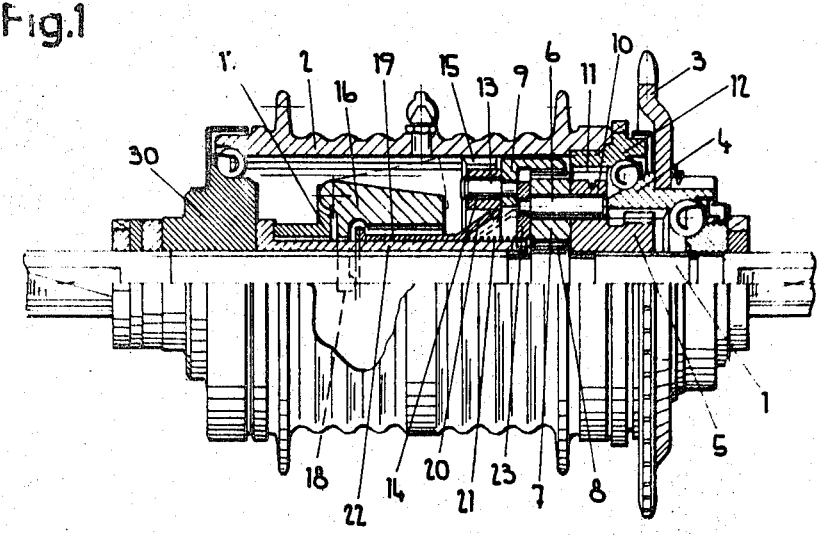
FIG. 1 shows a multiple-speed hub of the invention in side elevation and partly in section on its axis.

Referring initially to FIG. 1, there is seen a bicycle hub supported on a stationary shaft 1. One axial end of a hub shell 2 of approximately cylindrical configuration about the shaft axis is rotatably mounted on the shaft 1 by means of a ball bearing interposed between the shell and a stationary bearing member 30. A drive sprocket 3, which is normally connected to the pedaling mechanism of a bicycle by a chain, is mounted on a tubular driver 4 outside the shell 2, ball bearings being interposed coaxially between the driver 4 and the shaft 1, and between the driver 4 and a bearing ring 12 in the axial end of the shell 1 remote from the bearing member 30.

The driver 4 is the input member of a planetary gear transmission otherwise enclosed within the shell 2. It includes a planet carrier 5 which is coupled to the driver 4 by engaged splines preventing angular displacement of the driver and carrier relative to the hub axis, and by elements, not shown in detail, which prevent axial movement of the driver and planet carrier in the assembled condition of the hub.

Three planet shafts 6 on the carrier 5, of which only one is seen in the drawing, are equiangularly distributed about the hub axis and carry respective planet gears 7 in simultaneous meshing engagement with a stationary sun gear 8 on the shaft 1 and with a ring gear 9. A retaining ring 23 fixedly attached to the free ends of the shafts 6 holds the planet gears 7 in their axial positions.

Pawls 10 on the planet carrier 5 are held in engagement with an internal ratchet rim 11 on the bearing ring 12 by a pawl spring. Pins 13 axially projecting from an inturned flange on the ring gear 9 carry pawls 14 which are two-armed levers. An engaging arm of each pawl terminates in a tooth biased toward engagement with a ratchet 15 on the hub 2 by a non-illustrated pawl spring.

The apparatus described so far is basically conventional, and its operation is well understood. The ring gear 9 rotates at a higher speed than the planet carrier 5. As long as the pawls 14 are disengaged, as seen in the drawing, power is transmitted from the pedaling mechanism to the hub 2 by a first overrunning clutch constituted by the pawls 10 and the ratchet 11 which permits coasting or freewheeling when the hub shell 2 turns faster than the pawl carrier. When the pawls 14 engage the ratchet 15, the hub shell 2 is turned faster at equal pedaling speed by the second overrunning clutch constituted by the pawls 14 and the ratchet 15 than by the first clutch connected to the planet carrier 5.

The second overrunning clutch 14, 15 may be disengaged by a centrifugal governor with which this invention is more closely concerned.

Two flyweights 16, of which only one is shown in the drawing, are pivotally mounted on brackets 17 attached to a driving sleeve 22. The sleeve is fixedly fastened to the retaining ring 23 on the pawl carrier 5, and thus rotates jointly with the latter. An arm 18 on each flyweight 16 is approximately fork-shaped and is engaged by an outer radial flange on a control sleeve 19 axially slidable on the driving sleeve 22, and biased toward the arm 18 by a helical compression spring 21 interposed between the sleeve 19 and the retaining ring 23.

The axial end portion 20 of the control sleeve 19 near the planetary gear transmission flares conically and normally engages an operating arm of each pawl 14 to hold the pawl tooth out of engagement with the ratchet 15, the spring 21 being much stronger than the non-illustrated pawl spring. The spring 21 also biases the flyweights 16 toward the illustrated inoperative position.

When the pedaling speed reaches a value that can be selected by the choice of a suitable spring 21, the flyweights 16 pivot radially outward on the brackets 17, and the arms 18 push the control sleeve 19 toward the planetary gearing against the restraint of the spring 21 into the position indicated in broken lines in FIG. 1. The conically flaring end portion 20 releases the operating arms of the pawls 14, and the teeth of the same drivingly engage the ratchet 15. If pedaling is discontinued during coasting or freewheeling, the sprocket 3, driver 4, planet carrier 5, driving sleeve 22, and bracket 17 no longer rotate, and the spring 21 returns the flyweights 16 to the illustrated position, thereby disengaging the pawls 14 from the ratchet 15. The pawls 14 and ratchet 15 are not worn during coasting, and their friction does not interfere with the free movement of the hub shell 2.

Figure 2:
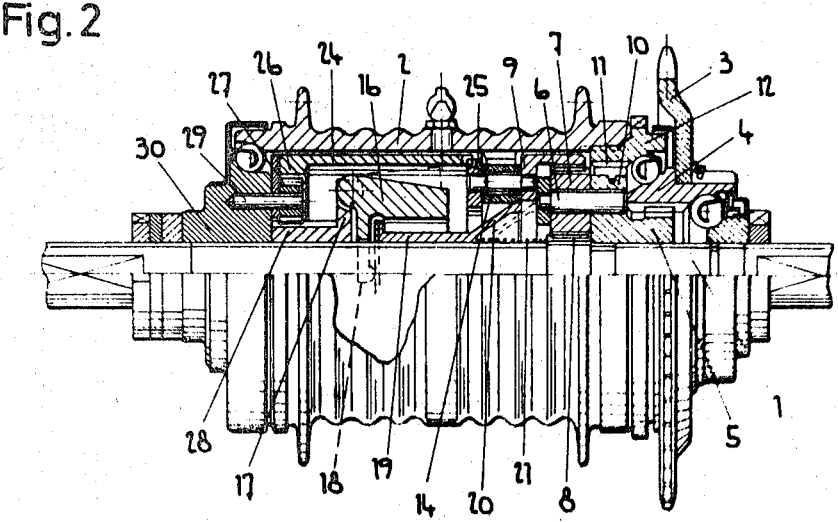
FIG. 2 shows a modification of the hub of FIG. 1.

The dual-speed hub shown in FIG. 2 is identical in its shell, planetary gearing, and overrunning clutches to the first-described apparatus of the invention. The same numerals have been used to designate identical elements which need not again be described.

The pawls 14 are retained on their pins 13 on the ring gear 9 by a common retaining ring 25 attached to the free ends of the pins. Engaging teeth on the ring 25 and on a sleeve 24 closely adjacent the hub shell 2 and enveloping the flyweight 16 cause the sleeve to turn at the relatively high speed of the ring gear 9 when the latter is turned by pedaling. An inner gear rim 26 on the axial end of the sleeve 24 remote from the ring 25 meshes with a small gear 27 mounted on a stationary pin 29 on the bearing member 30 for rotation about an axis parallel to, but radialy offset from the hub axis. The gear 27 also meshes with a central gear 28 integral with the brackets 17 which carry the flyweights 16, as described above. The flyweights cooperate with a control sleeve 19 for engaging and disengaging the pawls 14, as described with reference to FIG. 1.

The sleeve 24 which is fixedly attached to the ring gear 9 in the assembled hub is thus the input member of a drive mechanism and is connected to the output member 17, fixedly fastened to the illustrated weight 16 for joint rotation, by a connecting, speed-increasing gear transmission 26, 27, 28.

The apparatus of FIG. 1 is readily modified in the manner of FIG. 2 for transmission of motion between the planet carrier 5 and the driving sleeve 22 through a speed-increasing transmission identical with that of FIG. 2, but provided with a ring gear similar to the gear rim 26 and attached to the pawl carrier. Conversely, the hub shown in FIG. 2 may be modified in an obvious manner for a direct and fixed connection between the ring gear 9 and a common hub of the brackets 17 identical with the gear 28, but shorn of its teeth.

What is claimed is:
1. A multiple-speed hub comprising, in combination:
   (a) a normally stationary shaft having an axis;
   (b) a hub shell rotatable about said axis;
   (c) a driver member rotatable about said axis;
   (d) a multiple speed transmission arranged in said hub shell and including a plurality of transmission members operatively connected to said driver member and connected to each other for simultaneous rotation at different speeds;
   (e) two overrunning clutch means respectively interposed between two of said transmission members and said hub shell for transmitting movement from said driver member to said hub shell;
   (f) a flyweight mounted in said hub shell for rotation about said axis and for movement toward and away from said axis in response to a change in centrifugal forces acting on said flyweight;
   (g) speed shifting means operatively connected to said flyweight and to one of said clutch means for engaging and disengaging said one clutch means in response to said movement of the flyweight; and
   (h) speed increasing gear means drivingly connecting said flyweight to one of said transmission members, said gear means including
      (1) a first gear member fixedly connected to one of said transmission members for rotation therewith;
      (2) a second gear member fixedly fastened to said flyweight for rotation therewith; and
      (3) a third gear member rotatably fastened to said shaft in simultaneous meshing engagement with said first and second gear members.

2. A hub as set forth in claim 1, wherein said drive means include stopping means for preventing rotation of said flyweight when said drive member does not rotate.

3. A hub as set forth in claim 1, wherein said transmission includes a sun gear, a ring gear, a planet gear simultaneously meshing with said sun and ring gears, and a planet carrier mounted for rotation about the common axis of said sun and ring gears and carrying said planet gear, said first gear member being connected with said ring gear for joint rotation therewith.

4. A hub as set forth in claim 1, further comprising a bearing member fixed on said shaft, respective axial ends of said hub shell being rotatably supported on said driver member and on said bearing member, said flyweight being axially interposed between said bearing member and said transmission, said third gear member being mounted on said bearing member for rotation about an axis spaced from the axis of said shaft, and a sleeve member fixedly connected with said one transmission member and carrying said first gear member.

5. A hub as set forth in claim 4, said sleeve member enveloping said flyweight.

References Cited

UNITED STATES PATENTS

| | | | |
|---|---|---|---|
| 2,910,157 | 10/1959 | Gleasman | 74—752 |
| 3,143,005 | 8/1964 | Schwerdhöfer | 74—752 |
| 3,180,167 | 4/1965 | Paschakarnis | 74—752 |
| 3,369,429 | 2/1968 | Kimpflinger et al. | 74—752 |
| 3,388,617 | 6/1968 | Nelson | 74—752 |

FOREIGN PATENTS 245,261  10/1946  Switzerland _____ 74—750

WILLIAM L. FREEH, Primary Examiner